(No Model.) 3 Sheets—Sheet 1.
C. A. HOWARD.
CAR AXLE LUBRICATOR.
No. 399,899. Patented Mar. 19, 1889.
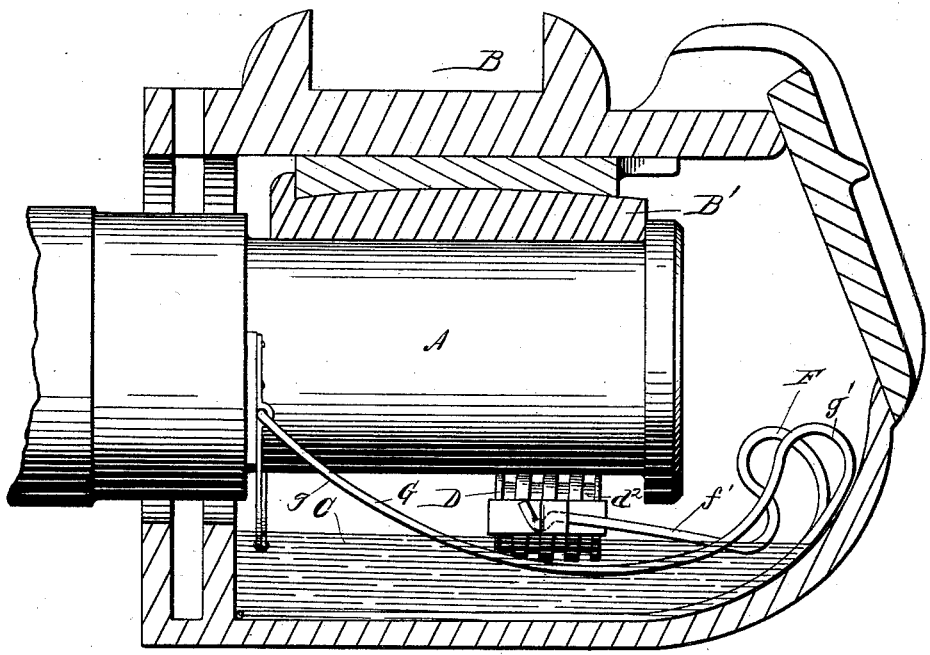
Fig. 1.
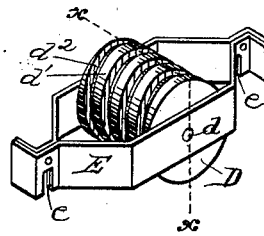
Fig. 3.
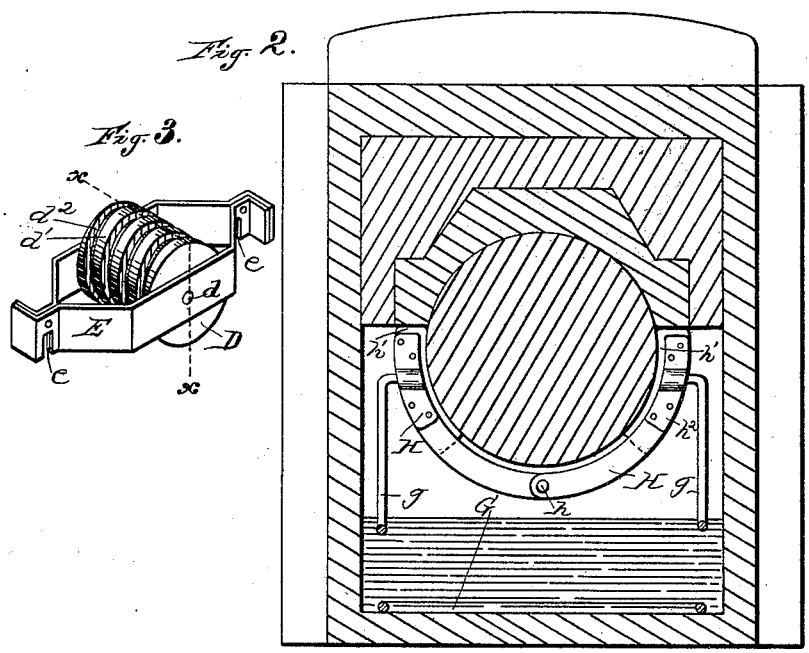
Fig. 2.
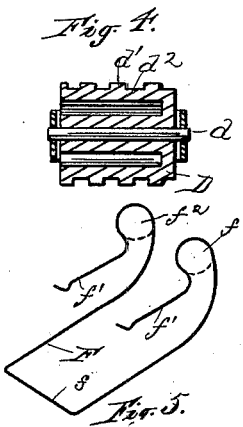
Fig. 4.
Fig. 5.
WITNESSES
H. H. Chamberlin
Samuel E. Thomas
INVENTOR
Charles A. Howard
By W. W. Leggett
Attorneys

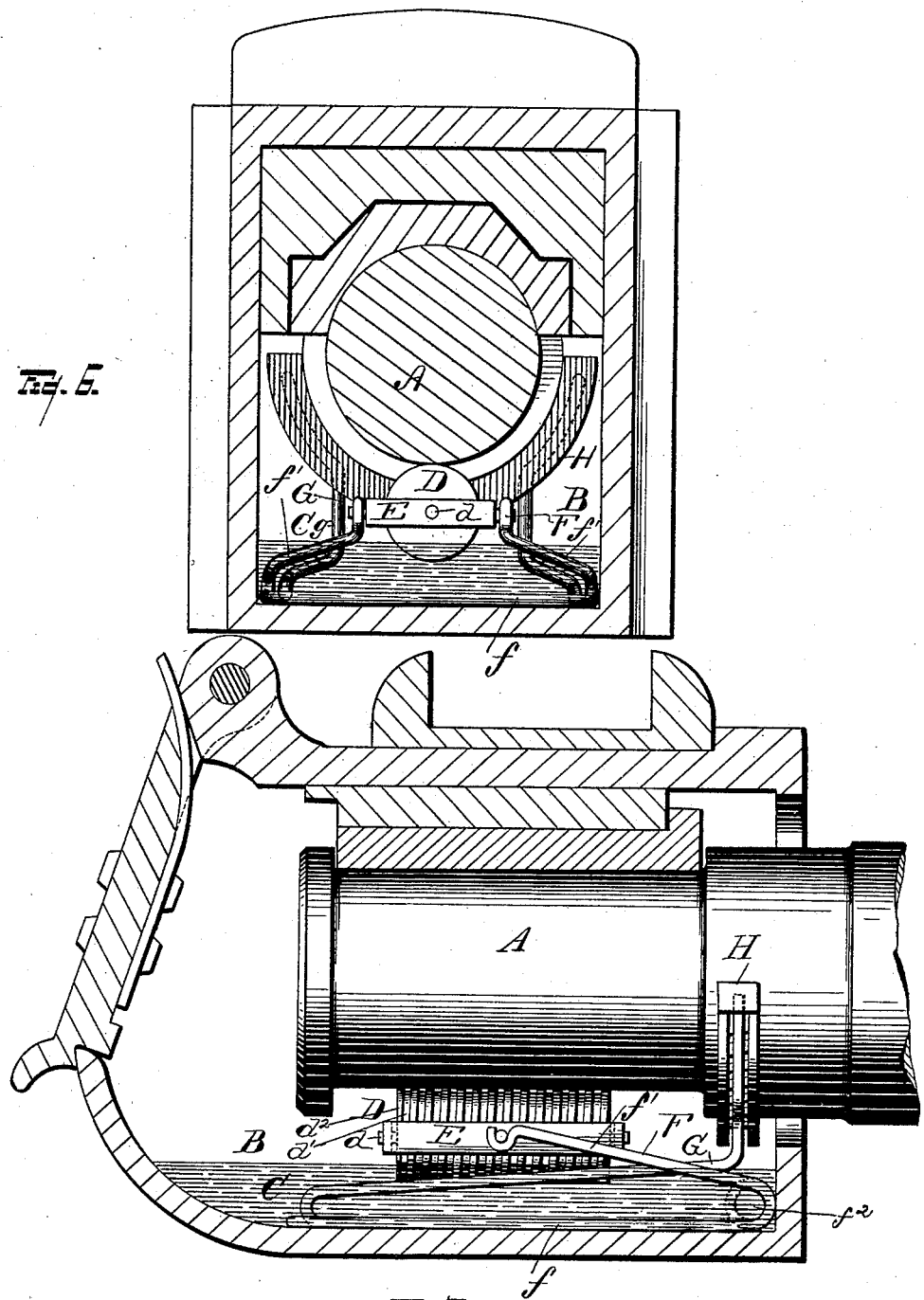

(No Model.) 3 Sheets—Sheet 3.
C. A. HOWARD.
CAR AXLE LUBRICATOR.
No. 399,899. Patented Mar. 19, 1889.
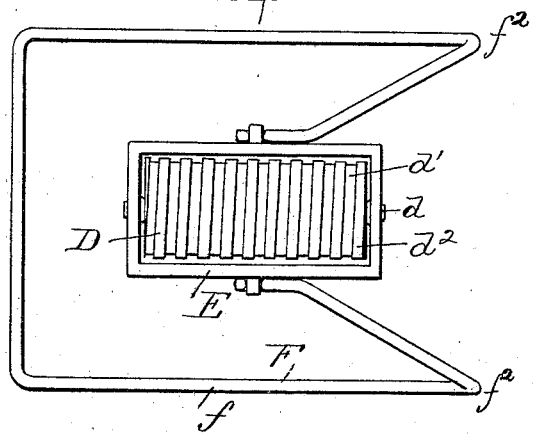
Fig. 8
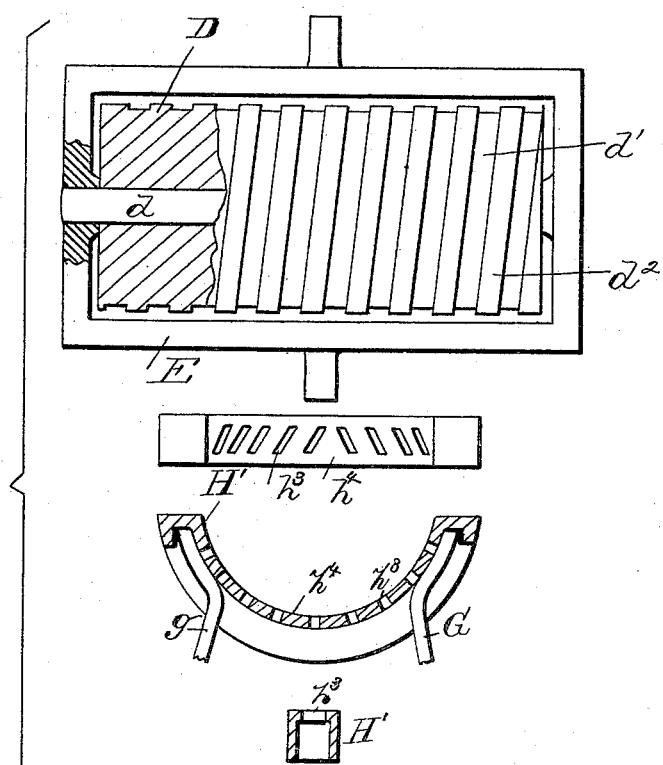
Fig. 9.
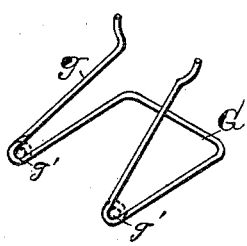
WITNESSES.
Samuel E. Thomas
M. B. O'Dogherty.
INVENTOR.
Charles A. Howard
By W. W. Jeggeis
Attorneys.

UNITED STATES PATENT OFFICE.

CHARLES A. HOWARD, OF PONTIAC, ASSIGNOR TO HENRY C. HODGES AND CHARLES C. HODGES, OF DETROIT, MICHIGAN.

CAR-AXLE LUBRICATOR.

SPECIFICATION forming part of Letters Patent No. 399,899, dated March 19, 1889.

Application filed November 6, 1888. Serial No. 290,094. (No model.)

*To all whom it may concern:*

Be it known that I, CHARLES A. HOWARD, a citizen of the United States, residing at Pontiac, county of Oakland, State of Michigan, have invented a certain new and useful Improvement in Car-Axle Lubricators; and I declare the following to be a full, clear, and exact description of the same, such as will enable others skilled in the art to which it appertains to make and use the same, reference being had to the accompanying drawings, which form a part of this specification.

It is the object of my invention to provide a car-axle lubricator that can be easily and quickly attached to any railway-car axle, and one that, by reason of its peculiar construction, will yield to any motion of the axle and yet remain in contact therewith, thus proving an effectual lubricator at all times. My lubricator is also constructed in such a manner that, no matter in which direction the axle revolves, the body of the oil or other lubricant will be kept in constant circulation. My device also prevents the oil from being wasted at the back of the journal-box where the axle enters the box, as would be apt to be the case after either the axle or the journal-box had become somewhat worn.

In the drawings, Figure 1 represents a side elevation of a car-axle and its journal-box with my lubricator in position, the box and journal-bearing being in section. Fig. 2 is an end elevation of a section of axle and box with my wiper in position. Fig. 3 is a perspective view of the cylinder and yoke. Fig. 4 is a sectional view of the cylinder on the line $x\,x$ of Fig. 3. Fig. 5 is a view of the supporting-frame. Fig. 6 is an end elevation, and Fig. 7 a side elevation, of a variation; Fig. 8, a plan view of a variation of the cylinder with the supporting-frame. Fig. 9 is a view of detailed parts of the variation of the wiper.

In the use of my lubricator the waste or packing now generally used is abandoned, and in its stead the journal-box is filled or partially filled with the lubricant, and my device being inserted in the box serves to agitate the lubricant and carry it up to the axle, and also in a measure to prevent unnecessary waste, as will be hereinafter more fully set forth.

In the drawings, A represents an ordinary car-axle; B, the journal-box thereof; B', the journal-bearing, and C the lubricant used to lubricate the axle.

D is a cylinder adapted to revolve with the axle on its own axis $d$, which rests in the yoke E, and the latter is movably supported at right angles to the cylinder D by the frame F, the notches $e$ in the yoke E resting on the arms $f'$ of the frame F, the latter resting on the bottom of the journal-box. This frame F, I have found most effective and cheaply manufactured when composed of a piece of stiff wire bent substantially as shown, so as to form a foundation, $f$, having two arms, $f'$, projecting upward at an angle on the ends of which the cylinder-yoke E is supported. As will be seen, these arms $f'$ will have sufficient elasticity to keep the cylinder always adjacent to the axle regardless of the vertical motion of the latter, while the double journaling of the cylinder gives it a universal motion, thus enabling it to yield with the axle and yet remain in contact therewith when the latter has an irregular motion—as, for instance, when the car is rounding a curve or when the journal-box is deranged in position with respect to the axle.

$d^2$ is a spiral groove on the peripheral surface of the cylinder, thus leaving a correspondingly-shaped ridge, $d'$, which is adapted by the elasticity of the arms $f'$ to be kept in contact with the under surface of the axle, thus causing the cylinder to revolve with the latter.

It will now be readily seen that by putting enough oil in the journal-box so that the under surface of the cylinder will come in contact therewith sufficient oil will be carried up to the axle by the cylinder to amply lubricate the former.

I have described the ridge $d'$ as being spiral shaped, and I would prefer making it in this way, since this peculiar shape not only serves to carry the oil to the axle, but causes the oil to circulate in the box by drawing it toward the cylinder, no matter in which direction the axle revolves, thus constantly agitating it. However, it is obvious that by providing the cylinder with annular ridges, or, if desired, leaving the peripheral surface of the cylinder plain, the object of my invention would be accomplished—viz., the carrying of a sufficient quantity of oil to the axle and maintaining the cylinder always in firm and extended contact with the axle.

G is a frame similar in shape and construction to the frame F and having spring-arms $g$, which adjacent to their ends are loosely engaged with two semicircular-shaped pieces of metal, H. These pieces are at their lower ends, $h$, pivotally engaged together, and at their upper ends provided with strips of leather, rawhide, or other suitable material, $h'$, the metal pieces H, with their leather tips $h'$, forming a wiper and adapted to be clamped on the axle at the back of the journal-box and underneath or beyond the end of the journal-bearing. This construction is designed to prevent the oil from wasting at the back of the journal-box by scraping or wiping it off adjacent to the end of the journal-bearing B'. I have shown this wiper as being composed of metal pieces with leather tips; but it is evident that the leather tips might be discarded or the whole construction be of leather or analogous material supported by the frame. So, also, I have shown the wiper as supported by an individual frame; but it is evident that the frame F might be utilized for this purpose, if desired, without departing from the spirit of the invention. So, also, a small casting, H', of semicircular shape, might be supported by the frame G, the casting being provided with diagonal slots $h^3$, leaving the surfaces $h^4$, on which the oil may be collected and returned to the box through the slots $h^3$.

Of course the shape of the supporting-frame F may be varied, and also the shape of the yoke E and the cylinder D, as shown in Figs. 6, 7, 8, and 9.

The spring supporting-frame G not only serves to force the wipers upward against the axle, but to simultaneously crowd them laterally against the axle, and both the frames F G may be formed as shown in the drawings; or, if desired, an additional turn may be given the wire at $f^2$ $g'$, as shown by the dotted lines.

The device for preventing the waste of oil may or may not be employed.

What I claim is—

1. A car-axle lubricator consisting of a single grooved cylinder supported by a yielding spring-frame and adapted to be constantly held in rolling contact with the axle, and in combination therewith a spring-impelled collar at the back of the journal-box for preventing waste of the lubricant, substantially as described.

2. In a car-axle lubricator, the combination, with a single spring-impelled lubricating-roller, of a wiper consisting of the jaws H, pivoted at their bottoms and provided with the tips $h'$, of leather or other suitable material, at their tops, and held in close and yielding contact with the axle by the spring-arms $g$, substantially as described.

3. A wiper for car-axles, consisting of two curved jaws, H, pivoted at their bottoms and supported adjacent to the axle by the yielding spring-frame G, said jaws provided with the slots $h^3$, substantially as described.

In testimony whereof I sign this specification in the presence of two witnesses.

CHARLES A. HOWARD.

Witnesses:
M. B. O'DOGHERTY,
SAMUEL E. THOMAS.